United States Patent
Phillipps et al.

[11] 3,856,828
[45] Dec. 24, 1974

[54] ANTI-INFLAMMATORY STEROIDS OF THE ANDROSTANE SERIES HAVING A HALO-SUBSTITUTED $C_1$-$C_2$ ALKOXY CARBONYL GROUP AT THE 17$\beta$ POSITION

[75] Inventors: Gordon Hanley Phillipps, Wembley; Peter John May, North Harrow; Brian McDonald, Chalfont St. Peter; Edward Arthur Woollett, Fulmer, all of England

[73] Assignee: Glaxo Laboratories Limited, Middlesex, England

[22] Filed: July 16, 1973

[21] Appl. No.: 379,471

[30] Foreign Application Priority Data
July 19, 1972   Great Britain.................... 33834/72

[52] U.S. Cl............................. 260/397.1, 424/243
[51] Int. Cl......................................... C07c 169/24
[58] Field of Search............................. 260/397.1; /Machine Searched Steroids

[56] References Cited
FOREIGN PATENTS OR APPLICATIONS
778,285   7/1972   Belgium

*Primary Examiner*—Henry A. French
*Attorney, Agent, or Firm*—Bacon & Thomas

[57] ABSTRACT
The Specification describes compounds of the general formula

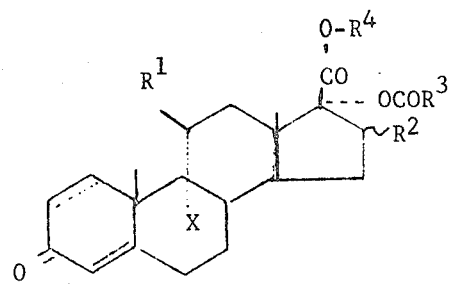

I wherein X represents a hydrogen, chlorine or fluorine atom;

$R^1$ represents a $\beta$-hydroxy group, an oxo group or (when X is a chlorine atom) a $\beta$-chlorine atom;

$R^2$ represents a hydrogen atom, a methylene group or an $\alpha$- or $\beta$-methyl group;

$R^3$ represents a hydrogen atom or $C_{1-4}$alkyl or phenyl group;

$R^4$ represents a methyl group substituted by at least one halogen atom; an ethyl group substituted by at least one fluorine and/or iodine atom; or a propyl group substituted by at least one halogen atom; and ===represents a single or double bond. The Specification also describes processes for the preparation of compounds of formula I as well as pharmaceutical compositions containing such compounds. The compounds of formula I have good anti-inflammatory activity, particularly on topical application.

19 Claims, No Drawings

ANTI-INFLAMMATORY STEROIDS OF THE ANDROSTANE SERIES HAVING A HALO-SUBSTITUTED $C_1$-$C_2$ALKOXY CARBONYL GROUP AT THE 17β POSITION

The present invention relats to novel anti-inflammatory steroids of the androstane series.

Our Belgian Patent No. 778,285 describes and claims a novel class of androstane steroids having anti-inflammatory activity, these steroids containing an esterified carboxyl group in the 17β-position and an esterified hydroxy group in the 17α-position. Such steroids may broadly be represented by the general formula

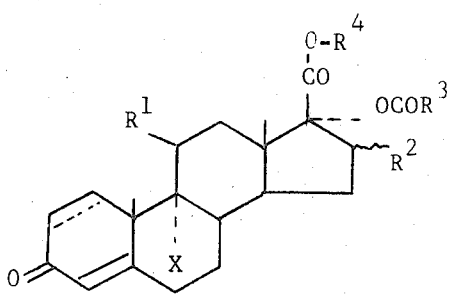

where X represents a hydrogen, chlorine or fluorine atom;
$R^1$ represents a β-hydroxy group, a β-chlorine atom or an oxo group;
$R^2$ represents a hydrogen atom, a methylene group or an α- or β-methyl group;
$R^3$ represents a hydrogen atom or an alkyl group, preferably containing 1-3 carbon atoms or a phenyl group;
$R^4$ represents a lower alkyl group, which may be substituted by at least one halogen atom or by a lower acyloxy group or a lower alkoxycarbonyl group; and ==== represents a single or double bond. In our above Belgian Patent, certain exclusions were made from this general class.

We have now discovered that among this class of androstane steroids those in which $R^4$ is a haloalkyl group have particularly advantageous anti-inflammatory activity, especially on topical application.

According to one feature of the present invention we provide compounds of the general formula

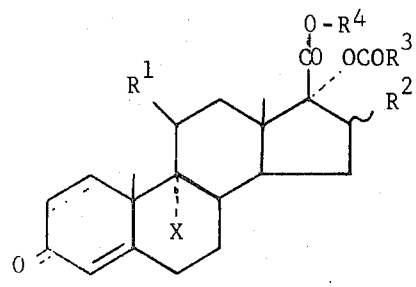

I wherein X represents a hydrogen, chlorine or fluorine atom; $R^1$ represents a β-hydroxy group, an oxo group or (when X is a chlorine atom) a β-chlorine atom; $R^2$ represents a hydrogen atom, a methylene group or an α- or β-methyl group; $R^3$ represents a hydrogen atom or a $C_1$-$_4$ alkyl or phenyl group; $R^4$ represents a methyl group substituted by at least one halogen atom; an ethyl group substituted by at least one fluorine and/or iodine atom; or a propyl group substituted by at least one halogen atom; and ==== represents a single or double bond.

The only 17β-haloalkoxycarbonyl steroids specifically described in our above Patent are 2'chloroethyl and 2'-bromoethyl 9α-fluoro-11β-hydroxy-16β-methyl-3-oxo-17α-propionyloxy-androsta-1,4-diene-17β-carboxylate; the 17β-haloalkoxycarbonyl steroids which we have subsequently tested and which are the subject of the present application have generally shown markedly superior anti-inflammatory properties as compared with these two compounds.

In formula I above, $R^4$ preferably represents a halogen-substituted methyl or ethyl group. Fluorine or chlorine are preferred substituents on the specified alkyl groups. For example, $R^4$ may represent a halomethyl group, e.g., a fluoro-, chloro-, bromo- or iodomethyl group; or a fluoro alkyl group such as a 2-fluoro-ethyl or 3-fluoro-propyl group.

In general, those groups $r^4$ which are lighter than the chloroethyl and bromoethyl groups are preferred i.e., the fluoro and chloromethyl groups and fluoroethyl group.

Those compounds of formula I wherein $R_3$ represents an alkyl group containing 1 to 3 carbon atoms are generally preferred, and it is particularly preferred, in general, that $R^1$ represents a β-hydroxy group.

In general, compounds in which ==== represents a double bond have been found to have good topical anti-inflammatory activity. X is also preferably fluorine or hydrogen. $R^2$ is preferably a methyl group, advantageously in the β-configuration, or a methylene group.

Preferred compounds of formula 1 above on account of their high topical anti-inflammatory activity are those wherein $R^3$ represents an ethyl group and $R^1$ represents a β-hydroxy group, $R^2$ advantageously representing a methyl group in the β-configuration.

A further preferred class of compounds of formula I are those wherein X represents a fluorine atom, $R^1$ represents a β-hydroxy group, $R^2$ represents a methylene group and ==== represents a double bond.

Compounds of formula I in which $R^1$ represents a β-hydroxy group, $R^2$ represents hydrogen, X represents hydrogen and ==== represents a single bond are also of particular interest.

A particularly preferred class of compounds of formula I having especially favourable topical anti-inflammatory activity are those wherein $R^4$ represents a methyl group substituted by a fluorine or chlorine atom e.g. a chloromethyl group or a fluoroethyl group.

Particularly preferred compounds of formula I according to the present invention include those set out in the following Table (==== representing a double bond)

| X | $R_1$ | $R_2$ | $R_3$ | $R_4$ |
|---|---|---|---|---|
| F | β—OH | β—$CH_3$ | $C_2H_5$ | $CH_2CH_2F$ |
| do. | do. | do. | do. | $CH_2Cl$ |
| H | do. | do. | do. | do. |
| F | do. | do. | do. | $CH_2F$ |
| Cl | do. | do. | do. | $CH_2F$ |
| F | do. | α—$CH_3$ | do. | do. |
| do. | do. | =$CH_2$ | do. | $Ch_2Cl$ |
| do. | do. | do. | do. | $CH_2F$ |
| H | do. | β—$CH_3$ | do. | $CH_2F$ |

A further interesting compound according to the invention is 3'-fluoropropyl 9α-fluoro-11β-hydroxy-16β-methyl-3-oxo-17α-propionyloxy-androsta-1,4-diene-17β-carboxylate.

The new compounds according to the present invention can generally be prepared according to the methods described in our above-mentioned Belgian Patent No. 778,285.

Thus, according to a further feature of the present invention, we provide a process for the preparation of compounds of formula I (as hereinbefore defined) which comprises esterifying a corresponding 17α-monoester 17β-carboxylic acid (or functional equivalent thereof) or 17α-hydroxy 17β-carboxylate to produce the desired compound according to the invention.

Thus, for example, the compounds described above may be prepared by reacting a salt of the parent 17α-carboxylic acid with an appropriate halo compound serving to introduce the desired group $R^4$ in the compound of formula I; the halo compound is preferably one containing an iodine atom in addition to the halogen atom of the resulting $R^4$ group. This method is particularly applicable to the preparation of those compounds of formula i wherein $R^4$ represents a chloromethyl, trifluoroethyl or tetrafluoropropyl group, the said halo compound being iodochloromethane, iodotrifluoroethane or iodotetrafluoropropane respectively.

The above-described reaction is advantageously effected using as the salt of the parent 17β-carboxylic acid an alkali metal, e.g. lithium, sodium or potassium salt or a quaternary ammonium salt such as the triethylammonium or tetrabutylammonium salt, conveniently in a polar solvent such as a ketone, e.g. acetone or methylethyl ketone or an amide solvent such as dimethylformamide or hexamethylphosphoramide.

Those compounds of formula I wherein $r^4$ represents a dichloromethyl group may be conveniently prepared by reacting the corresponding parent 17β-carboxylic acid with an aryl, e.g. phenyl, (bromodichloro methyl) mercury, preferably in a solvent, e.g. benzene and conveniently at an elevated temperature preferably at the reflux temperature of the reaction mixture.

According to a further feature of the present invention we provide a further process for the preparation of compounds of formula I (as hereinbefore defined) which comprises subjecting a compound of formula I to a halogen exchange reaction serving to replace the halogen substituent in the group $R^4$ by a different halogen substituent. Thus, for example iodoalkyl 17β-carboxylate compounds may be prepared from corresponding chloroalkyl 17β-carboxylate compounds using for example an alkali metal, alkaline earth metal or quaternary ammonium iodide, e.g. sodium iodide. Similarly, bromoalkyl 17β-carboxylate compounds may be prepared from corresponding iodoalkyl 17-β-carboxylate compounds using a bromide salt such as lithium bromide. The reaction is advantageously effected in a solvent medium comprising for example acetone, methyl ethyl ketone, dimethylformamide, dimethylacetamide, hexamethylphosphoramide or ethanol.

A similar halogen displacement reaction may be employed to prepare fluoroalkyl 17β-carboxylate compounds from the corresponding chloro- or iodo-alkyl compound, namely reaction with an appropriate fluoride, e.g. silver monofluoride or silver difluoride, conveniently in a solvent, for example acetonitrile. This halogen displacement reaction is particularly advantageous for the preparation of the fluoromethyl and fluoroethyl compounds of formula I.

The new haloalkyl 17β-carboxylate compounds can also be prepared from a corresponding sulphonyloxyalkyl, e.g. mesyloxyalkyl, compound by reaction with an alkali metal, alkaline earth metal or quaternary ammonium halide conveniently in a solvent medium, e.g. aetone, dimethyl formamide, hexamethyphosphoramide or ethanol. The sulphonyloxy compound may be prepared from a corresponding hydroxyalkyl compound produced, for example, by reaction of a 17β-carboxylic acid salt with an appropriate halohydrin.

The parent 17β-carboxylic acids referred to above may be prepared according to the process described in our Belgian Patent No. 778,285 as illustrated in the Preparations given hereinafter.

The esterification of the 17α-hydroxy group in the preparation of the new androstane compounds may be effected in known manner, e.g. by reacting the parent 17α-hydroxy compound with an appropriate carboxylic acid, advantageously in the presence of trifluoroacetic anhydride and preferably in the presence of an acid catalyst, e.g. p-toluene-sulphonic acid or sulphosalicylic acid.

The reaction is advantageously effected in an organic solvent medium such as benzene, methylene chloride or an excess of the carboxylic acid employed, the reaction being conveniently effected at a temperature of 20°–100°C.

Alternatively, the 17α-hydroxy group may be esterified by reaction of the parent 17α-hydroxy compound with the appropriate acid anhydride or acid chloride, if desired, in the presence of non-hydroxylic solvents, e.g. chloroform, methylene chloride or benzene, and preferably in the presence of a strong acid catalyst, e.g. perchloric acid, p-toluene sulphonic acid or a strongly acidic cation exchange resin, e.g. Amberlite IR 120, the reaction being conveniently effected at a temperature of 25° to 100°C.

For the preparation of the 17α-esters of the 17β-carboxylic acids which may be employed in the preparation of the compounds according to the invention, it is often preferred to treat the parent 17α-hydroxy compound with the appropriate carboxylic acid anhydride to give the 17α-ester of the mixed anhydride of the androstane 17β-carboxylic acid and the carboxylic acid of the starting anhydride, this reaction being conveniently effected at an elevated temperature, the resulting anhydride then being solvolysed under acidic conditions (e.g. using aqueous acetic acid) or under basic conditions (e.g. using aqueous pyridine or a secondary amine such as diethylamine in acetone).

Compounds wherein the 11-position contains a keto group may be prepared for example by oxidation of a corresponding 11β-hydroxy compound, e.g. by means of chromium trioxide, conveniently in an inert solvent such as acetone, preferably in the presence of sulphuric acid. Alternatively, chromium trioxide in the presence of pyridine may be employed.

The above-described oxidation of an 11β-hydroxy group into an 11-keto group may be effected at any convenient stage in the synthesis of the androstane compounds.

The $\Delta^4$ compounds according to the invention can conveniently be prepared by partial reduction of the corresponding $\Delta^{1,4}$ compound, for example, by hydrogenation using a palladium catalyst, conveniently in a solvent e.g. ethyl acetate or by homogeneous hydrogenation using for example tris(triphenyl phosphine) rhodium chloride, conveniently in a solvent such as benzene, or by exchange hydrogenation using for example cyclohexane in the presence of a palladium catalyst in a solvent e.g. ethanol, preferably under reflux. This reduction may be carried out on a haloalkyl ester where this is sufficiently stable in such a reaction or may be effected at an earlier stage.

As is well known to those skilled in the art it may frequently be convenient to elaborate the desired substituents in the 17α- and 17β-positions at an intermediate stage of the preparation of the desired final compound, one or more other substituents (or unsaturation) being introduced at a later stage. For example, it is possible for the preparation of 11-oxo compounds first to prepare an 11-hydroxy compound having the desired 17α-acyloxy group and the desired 17β-carboxylate ester group and then oxidise the 11β-hydroxy group. Other instances where the desired substituents may be introduced before final elaboration of the remainder of the desired androstane molecule include for example preparing $\Delta^{9(11)}$ or Ring A saturated compounds having the desired 17α-acyloxy and 17β-carboxylate ester groups, completion of the elaboration of Rings A, B and C then being completed in conventional manner.

There are also provided pharmaceutical compositions for use in anti-inflammatory therapy, comprising at least one compound according to the invention together with one or more pharmaceutical carriers or excipients. Such compositions may be in forms adapted for topical or internal administration.

The active androstane compound may be formulated into a preparation suitable for topical administration with the aid of a topical vehicle therefor. Examples of various types of preparation for topical administration, include ointments, lotions, creams, powders, drops, (e.g. eye or ear drops), sprays, (e.g. for the nose or throat), suppositories, retention enemas, chewable or suckable tablets or pellets (e.g. for the treatment of aphthous ulcers) and aerosols. Ointments and creams may for example, be formulated with an aqueous or oily base with the addition of suitable thickening and/or gelling agents and/or glycols. Such base may thus, for example, include water and/or an oil such as liquid paraffin or a vegetable oil such as arachis oil or castor oil, or a glycolic solvent such as propylene glycol or 1,3-butane-diol. Thickening agents which may be used according to the nature of the base include soft paraffin, aluminium stearate, cetostearyl alcohol, polyethylene glycols, woolfat, hydrogenated lanolin and beeswax and/or glyceryl monostearate and/or non-ionic emulsifying agents.

The solubility of the steroid in the ointment or cream may be enhanced by incorporation of an aromatic alcohol such as benzyl alcohol, phenylethyl alcohol or phenoxyethyl alcohol.

Lotions may be formulated with an aqueous or oily base and will in general also include one or more of the following namely, emulsifying agents, dispersing agents, suspending agents, thickening agents, solvents, colouring agents and perfumes.

Powders may be formed with the aid of any suitable powder base e.g. talc, lactose or starch. Drops may be formulated with an aqueous base also comprising one or more dispersing agents, suspending agents or solubilising agents etc.

Spray compositions may for example be formulated as aerosols with the use of a suitable propellant, e.g. dichloro-difluoromethane or trichlorofluoromethane.

The proportion of active androstane compound in the topical compositions according to the inventon depends on the precise type of formulations to be prepared but will generally be within the range of from 0.0001 to 5.0 percent by weight. Generally however for most types of preparations advantageously the proportion used will be within the range of from 0.001 to 0.5 percent and preferably 0.01 to 0.25 percent.

Topical preparations may be administered by one or more applications per day to the affected area; over skin areas occlusive dressings may often be used with advantage.

For internal administation the new compounds according to the invention may, for example, be formulated for oral, parenteral or aectal administration. For oral administration, syrups, elixirs, powders and granules may be used which may be formulated in conventional manner. Dosage unit forms are however preferred as described below.

For parenteral administration the compounds may be presented in sterile aqueous or oily vehicles, suitable oily vehicles including arachis oil, olive oil etc.

Preferred forms of preparation for internal administration are dosage unit forms i.e. presentations in unitary form in which each unit contains a desired dose of the active steroid. Such dosage unit forms contain from 0.05 to 2.0mg, preferably from 0.25 to 1.0 mg of the active steroid. For oral administration suitable dosage unit forms include tablets, coated tablets and capsules. for parenteral administration dosage unit forms include sealed ampoules or vials each containing a desired dose of the steroid. Suppositories, which may be prepared for example with conventional commercial suppository bases, provide a dosage unit form for rectal administration. Sterile tablet or pellet implants may also be used, e.g. where slow systemic absorption is desired.

The compounds according to the invention may in general be given by internal administration in cases where systemic adreno-cortical therapy is indicated.

In general terms preparations for internal administration may contain from 0.01 to 5.0 % of active ingredient dependent upon the type of preparation involved. The daily dose may vary from 0.05 to 10.0 mg. dependent on the condition being treated and the duration of treatment desired.

The compositions according to the invention may also include one or more preservatives or bacteriostatic agents e.g. methyl hydroxy benzoate, propyl hydroxy benzoate, chlorocresol or benzalkonium chlorides. The compositions according to the invention may also contain other active ingredients such as antimicrobial agents, particularly antibiotics, such as neomycin.

The following Examples and Preparations illustrate the present invention.

PREPARATION 1

9α-Fluoro-11β-hydroxy-16-methylene-3-oxo-17α-propionyloxyandrosta-1,4-diene-17β-carboxylic acid A mixture of 9α-fluoro-11β,17α-dihydroxy-16-methylene-3-oxoandrosta-1,4-diene-17β-carboxylic acid (648 mg.) and redistilled triethylamine (0.80 ml.) in dry methylene chloride (16 ml.) was stirred at 0° and treated dropwise during 15 minutes with propionyl chloride (0.538 ml.). After being stirred at 0° for 30 minutes the mixture was diluted with methylene chloride and washed successively with 3 percent sodium bicarbonate solution, N-hydrochloric acid and water, then dried and evaporated in vacuo to a yellow foam. The foam was dissolved in acetone (20 ml.) and treated with diethylamine (0.62 ml.) and the mixture was stirred for 30 minutes before being concentrated under reduced pressure to give a colourless solid. The solid was collected, dissolved in water and the solution was acidified with 2N-hydrochloric acid. The product was extracted with ethyl acetate and the extracts were washed with water, then dried and evaporated in vacuo to give the title 16-methylene 17β-carboxylic acid 17α-propionate as an off-white crystalline solid (560 mg.), $\lambda_{max}$. 237.5 nm (ε15,500), homogenous on thin-layer chromatography on silica in chloroformacetone-acetic acid (7:2:1).

PREPARATION 2

9α-Fluoro-11β-hydroxy-16α-methyl-3-oxo-17α-propionyloxy-androsta-1,4-diene-17β-carboxylic acid Reaction of 9α-fluoro-11β,17α-dihydroxy-16α-methyl-3-oxoandrosta-1,4-diene-17β-carboxylic acid (3.4g.) with propionyl chloride (3.18 ml.), and triethylamine (4.17 ml.) in methylene chloride (80 ml.) followed by solvolysis of the product in acetone with diethylamine (3.24 ml.) by the procedure described in Preparation 14 afforded the title 17α-carboxylic acid 17α-propionate as a colourless crystalline solid, solvated with ethyl acetate, $\lambda_{max}$. 238.5 nm (ε 16,450), homogenous on thin-layer chromatography on silica in chloroform-acetone-acetic acid (7:2:1).

EXAMPLE 1

Chloromethyl
9α-fluoro-11β-hydroxy-16β-methyl-3-oxo-17α-propionyloxyandrosta-1,4-diene-17β-carboxylate A solution of 9α-fluoro-11β-hydroxy-16β-methyl-3-oxo-17α-propionyloxyandrosta-1,4-diene-17β-carboxylic acid (containing 0.7 mole ethyl acetate) (570 mg.) in dry dimethylformamide (1.4 ml.) was stirred and treated with triethylamine (0.208 ml.) and chloromethyl iodide (0.415 ml.) Stirring was continued at room temperature for 21 hours before further quantities of triethylamine (0.208 ml.) and chloromethyl iodide (0.415 ml.) were added. After a further 5 hours more, identical portions of the reagents were added and the product was isolated after a further 2½ hours. The reaction mixture was treated with ethyl acetate-ether (1:1, 5.8 ml.) and filtered. The filtrate was diluted with ethyl acetate and washed with water, 5 percent aqueous sodium bicarbonate, then with water again: after being dried, evaporation of the solvent gave a cream foam (323 mg.). Thin-layer chromatography of the mixture on silica and recrystallisation of the major product (197 mg.) from ether and from acetone gave the title chloromethyl 17βcarboxylate ester as colourless crystals (180 mg.), m.p. 210–213° decomp., $[\alpha]_D$ + 35° (c 1.05,dioxan), $\lambda_{max}$. 236 nm (ε 15,850) (Found: C,62. 4;H,6.6; Cl,7.2 $C_{25}H_{32}ClFO_6$ requires C, 62.2; H,6.7; Cl, 7.3%).

The minor product (76mg.), which was recrystallised from acetone to give colourless needles (59 mg.), $\lambda_{max}$. 236 nm (ε 31,800), was shown by its infrared and proton-magnetic resonance spectrum to be 1',1'-bis(9α-fluoro-11α-hydroxy-16β-methyl-3-oxoandrosta-1,4-diene-17β-carbonyloxy)methane.

EXAMPLE 2

Iodomethyl
9α-fluoro-11α-hydroxy-16β-methyl-3-oxo-17α-propionyloxyandrosta-1,4-diene-17β-carboxylate.

A solution of a mixture (500 mg.) containing chloromethyl 9α-fluoro-11β-hydroxy-16β-methyl-3-oxo-17α-propionyloxyandrosta-1,4-diene-17β-carboxylate (79%) and the corresponding bis-(androstane-17β-carbonyloxy) methane (21%) in acetone (16 ml.) was stirred with sodium iodide (1.23g.) at room temperature for 5 days. The mixture was concentrated under reduced pressure and treated with water to give a yellow, amorphous solid (521 mg.). Preparative layer chromatography in chloroform-acetone (40:1) on silica gave a major product (404 mg.) which was crystallised from acetone-ether to give off-white crystals (271 mg.), an acetone solvate of the title iodomethyl 17β-carboxylate, m.p. 158–160° (decomp.), $[\alpha]_D$ + 20° (c 1.04, dioxan), $\lambda_{max}$. 236.5 nm (ε 16,100). Found: C, 52.2; H, 5.6; I, 21.0. $C_{25}H_{32}FIO_4$. 1/4Me$_2$CO requires C, 52.5; H, 5.7; I, 21.5%).

EXAMPLE 3

Fluoromethyl
9α-fluoro-11β-hydroxy-16β-methyl-3-oxo-17α-propionyloxyandrosta-1,4-diene-17β-carboxylate.

A solution of a mixture (400 mg.) containing chloromethyl 9α-fluoro-11β-hydroxy-16β-methyl-3-oxo-17α-propionyloxyandrosta-1,4-diene-17β-carboxylate (79%) and the corresponding bis-(androstane-17β-carbonyloxy)methane (21%) in dry acetonitrile (4.7 ml.) was treated with silver monofluoride (0.735g.) and the mixture was stirred at room temperature for 5 days. Solid material was removed by filtration through kieselguhr and washed with ethyl acetate; the filtrate and washings were diluted with ethyl acetate and washed with water, dried over magnesium sulphate and evaporated in vacuo to a white foam (370 mg.). Thin-layer chromatography on silica in chloroform afforded the major product as a foam (278 mg.) which was purified by recrystallisation from acetone-petrol (b.p. 60–80°) to give the title fluoromethyl 17βcarboxylate as colourless crystals (180 mg.), $[\alpha]_D$ + 34° (c 0.96, dioxan), $\lambda_{max}$. 237.5 nm (ε 15,580). (Found: C, 64.0; H, 6.9; F, 7.9 $C_{25}H_{32}F_2O_6$ requires C, 64.4; H, 6.9; F, 8.1%).

EXAMPLE 4

2'-Fluoroethyl
9α-fluoro-11β-hydroxy-16β-methyl-3-oxo-17α-propionyloxyandrosta-1,4-diene-17β-carboxylate A solution of 2'-methanesulphonyloxyethyl 9α-fluoro-11β-hydroxy-16β-methyl-3-oxo-17α-propionyloxyandrosta-1, 4-diene-17β-carboxylate (178 mg.) in acetone (7 ml.) was refluxed with sodium iodide (478 mg.) for 5 hours. The mixture was concentrated to small volume and diluted with water to give a cream solid. Silica preparative-layer chromatography in chloroform gave the crude 2'-iodoethyl 17β-carboxylate as a white crystalline solid (157 mg.). The product was treated in dry acetonitrile (1.5 ml.) with silver monofluoride (237 mg.) at 50° for 1 hour then the mixture was refrigerated for 2–3 days. The reaction mixture was filtered through kieselguhr, the filtrate was diluted with water and the product was extracted with ethyl acetate; the extracts were washed with water, dried and evaporated in vacuo to give a colourless foam (111 mg.). Thin-layer chromatography on silica in chloroform gave the major product (65 mg.) which crystallised from ether to give the title 2'-fluoroethyl 17β-carboxylate as colourless crystals (42 mg.), m.p. 167–169°, $[\beta]_D + 32°$ (c 0.43, dioxan), $\lambda_{max.}$ 237.5 nm (ε 16,070). Found: C, 64.8; H, 7.2; F, 7.7. $C_{26}H_{34}F_2O_6$ requires C, 65.0; H, 7.1; F, 7.9%).

EXAMPLE 5

Chloromethyl
9α-chloro-11β-hydroxy-16β-methyl-3-oxo-17α-propionyloxyandrosta-1,4-diene-17β-carboxylate A mixture of sodium 9α-chloro-11β-hydroxy-16β-methyl-3-oxo-17α-propionyloxyandrosta-1,4-diene-17β-carboxylate (311.5 mg.) and chloromethyl iodide (0.23 ml.) in hexamethylphosphoramide (1.0 ml.) was stirred at room temperature for 70 minutes. The solution was diluted with ethyl acetate and washed with water, 5% sodium bicarbonate solution, again with water, then dried (magnesium sulphate) and solvent was removed. The resulting foam (302 mg.) was crystallised twice from acetone to give the title chloromethyl 17β-carboxylate as colourless crystals, m.p. 210–218° (decomp.), $[\beta]_D = 61°$ (c 0.93, dioxan), $\lambda_{max.}$ 237.5 nm (λ 15,300). (Found: C, 59.9; H, 6.4; Cl, 14.0 $C_{25}H_{32}Cl_2O_6$ requires C, 60.1; H, 6.5; Cl, 14.2%).

EXAMPLE 6

Chloromethyl
11β-hydroxy-16β-methyl-3-oxo-17α-propionyloxyandrosta-1,4-diene-17β-carboxylate Sodium 11β-hydroxy-16β-methyl-3-oxo-17α-propionyloxyandrosta-1,4-diene-17β-carboxylate (prepared from the free acid (336 mg.) and methanolic sodium hydroxide) and chloromethyl iodide (0.35 ml.) in hexamethylphosphoramide (1.2 ml.) were stirred at room temperature for 4 hours. The product was isolated by the procedure described in Example 5. Purification by silica chromatography and recrystallisation from acetone-petrol gave the title chloromethyl ester (99 mg.), m.p. 191–194°, $[\alpha]_D + 35°$ (C 1.09, dioxan), $\lambda_{max.}$ 242 nm (ε 15,000). (Found: C, 64.4; H, 7.1; Cl, 7.5. $C_{25}H_{33}ClO_6$ requires C, 64.6; H, 7.2; Cl, 7.6%).

EXAMPLE 7

11β,17α-Dihydroxy-16β-methyl-3-oxoandrosta-1,4-diene-17β-carboxylic acid

A solution of 16α-methylprednisolone (2.0g.) in dioxan (36 ml.) was treated with a solution of periodic acid (3.56g.) in water (5.4 ml.). After 30 minutes the mixture was concentrated in vacuo and water was added slowly to give a solid (2.06g.). A portion (156 mg.) was recrystallised from methanol to give the title 17β-carboxylic acid as white crystals (120 mg.), m.p. 246–258° (decomp.), $[\alpha]_D + 46°$ (c 0.88, dioxan), $\lambda_{max.}$ 242 nm (ε 14,450). (Found: C, 69.65; H, 7.7 $C_{21}H_{28}O_5$ requires C, 70.0; H, 7.8%).

EXAMPLE 8

11β-Hydroxy-16α-methyl-3-oxo-17α-propionyloxyandrosta-1,4-diene-17β-carboxylic acid.

Treatment of 11β,17α-dihydroxy-16α-methyl-3-oxoandrosta-1,4-diene-17β-carboxylic acid (1.9g.) with propionyl chloride (1.9 ml.) followed by solvolysis of the resulting product with diethylamine by the method described in Preparation 7 afforded crystalline 11β-hydroxy-16α-methyl-3-oxo-17α-propionyloxyandrosta-1,4-diene-17β-carboxylic acid acetone solvate, m.p. 161–163°, $[\alpha]_D + 17°$ (c 0.47, dioxan), $\lambda_{max.}$ 241.5 nm (ε 16,100). (Found: C, 67.7; H, 7.9. $C_{24}H_{32}O_6$ 1.5Me$_2$CO requires C, 68.0; H, 8.2%).

EXAMPLE 9

Chloromethyl
11β-hydroxy-16α-methyl-3-oxo-17α-propionyloxyandrosta-1,4-diene-17β-carboxylate A solution of 11β-hydroxy-16α-methyl-3-oxo-17β-propionyloxyandrosta-1,4-diene-17β-carboxylic acid (416 mg.) in 0.1N methanolic sodium hydroxide was evaporated and dried in vacuo over phosphorus pentoxide. The residual sodium salt was stirred with chloromethyl iodide (0.43 ml.) in hexamethylphosphoramide (1.48 ml.) at room temperature for 4 hours. The reaction mixture was diluted with ethyl acetate and washed successively with water, sodium bicarbonate solution, then water. Evaporation of the dried organic phase gave a partly crystalline foam which was recrystallised from acetone to give colourless crystals (257 mg.) of the title chloromethyl 17β-carboxylate, $[\alpha]_D + 29°$ (c 1.15, dioxan) $\lambda_{max.}$ 242.5 nm (ε 15,350). (Found: C, 64.1; H, 7.05; C1, 7.4. $C_{25}H_{33}ClO_6$ requires C, 64.6; H, 7.15; Cl, 7.6%).

Example 10

Chloromethyl
9α-fluoro-11β-hydroxy-16-methylene-3-oxo-17α-propionyloxyandrosta-1,4-diene-17β-carboxylate.

Sodium 9αfluoro-11β-hydroxy-16-methylene-3-oxo-17α-propionyloxyandrosta-1,4-diene-17β-carboxylate (739 mg.) (prepared from the free acid (784 mg.) and methanolic sodium hydroxide with precipitation by ether) and chloromethyl iodide (0.59 ml.) in hexamethylphosphoramide (1.95 ml.) were stirred at room temperature for 3¾ hours. The product was isolated as described in Example 5 and purified by recrystallisation from acetone to give the title chloromethyl-17β-carboxylate as a white crystalline solid, m.p. 220.5–223° (decomp.), $[\beta]_D - 68°$ (c 0.93, dioxan), $\lambda_{max.}$ 237 nm (ε 15,500). (Found: C, 62.0; H, 6.3; Cl, 7.2. $C_{25}H_{30}ClFO_6$ requires C, 62.4; H, 6.3; Cl, 7.4%).

EXAMPLE 11

Fluoromethyl
9α-fluoro-11β-hydroxy-16-methylene-3-oxo-17α-propionyloxyandrosta-1,4-diene-17β-carboxylate Chloromethyl 9α-fluoro-11β-hydroxy-16-methylene-3-oxo-17α-propionyloxyandrosta-1,4-diene-17β-carboxylate (260 mg.), silver monofluoride (480 mg.) and acetonitrile 4.1 ml. ) were stirred at room temperature for 7 days. The product was isolated as described in Example 3 to give a colourless crystalline solid (251 mg.), the title fluoromethyl ester, Recrystallisation from acetone gave colourless crystals (157 mg) mp 211–214° $[\alpha_D]$-77° (C 0.95 dioxan) λmax (EtOH) 237nm (ε 16,000)

Example 12 chloromethyl 9α-fluoro-11β-hydroxy-16α-methyl-3-oxo-17α-propionyloxyandrosta-1,4-diene-17β-carboxylate

Reaction of sodium 9α-fluoro-11β-hydroxy-16α-methyl-3-oxo - 17α-propionyloxyandrost - 1,4-diene-17β-carboxylate (757 mg.) (obtained from the free acid 860 mg.)) with chloromethyl iodide (0.58 ml.) in hexamethylphosphoramide (2.0 ml.) for 3 hours at room temperature by the procedure described in Example 5 and recrystallisation from acetone gave the title chloromethyl ester, m.p. 232–234° (decomp.), $[\alpha]_D$ + 21° (c 0.98, dioxan), $\lambda_{max.}$ 237 nm ($\epsilon$ 15,400). (Found: C, 62.0; H, 6.9; Cl, 7.25. $C_{25}H_{32}$ $ClFO_6$ requires C, 62.2; H, 6.7; Cl, 7.3%).

EXAMPLE 13

Fluoromethyl 9α-fluoro-11β-hydroxy-16α-methyl-3-oxo-17α-propionyloxyandrosta-1,4-diene-17β-carboxylate

Chloromethyl 9α-fluoro-11β-hydroxy-16α-methyl-3-oxo-17αpropionyloxyandrosta-1,4-diene-17β-carboxylate (288 mg.) was reacted with silver monofluoride (530 mg.) in dry acetonitrile (4.5 ml.) by the method decribed in Example 3 to give the title fluoromethyl ester, Crystallisation from acetone gave colourless crystals of the title compound (182 mg) mp 225–232°, $[\alpha]_D$ + 16° (c 1.05 dioxan), λmax (EtOH) 237 nm ($\epsilon$ 15,700).

EXAMPLE 14

Fluoromethyl 9α-chloro-11β-hydroxy-16β-methyl-3-oxo-17α-propionyloxyandrosta-1,4-diene-17β-carboxylate

Chloromethyl 9α-chloro-11β-hydroxy-16β-methyl-3-oxo-17α-propionyloxyandrosta-1,4 -diene-17β-carboxylate (476 mg.) was reacted with silver monofluoride (850 mg.) in acetonitrile (7.25 ml.) by the method described in Example 3. Preparative thin-layer chromatography of the product on silica in chloroform-cyclohexane (3:1) gave the title fluoromethyl ester which crystallised from acetone to afford colourless crystals (117 mg.), Recrystallisation from acetone gave colourless crystals (98 mg) mp 218–221° decomp, [α] + 64° (c 1.0 dioxan) λ max (EtOH) 237 nm ($\epsilon$ 15,650).

EXAMPLE 15

Chloromethyl 11β-hydroxy-3-oxo-17α-propionyloxyandrost-4-ene-17β-carboxylate.

Sodium 11β-hydroxy-3-oxo-17α-propionyloxyandrost-4-ene-17β-carboxylate (1.53g.) (obtained from the free acid (1.7g.) and methanolic sodium hydroxide) was treated with chloromethyl iodide (1.3 ml.) in hexamethylphosphoramide (4.29 ml.) at room temperature for 3 hours by the method described in Example 5 to give the title chloromethyl 17β-carboxylate, (1.58g). Recrystallisation from acetone gave off-white crystals (905 g.) m.p. 194–198° (decomp.). A second recrystallisation from acetone gave purer sample mp. 204.5–206° $[\alpha_D]$ + 67° (c 1.01 dioxan) λ max. (EtOH) 24 OnM ($\epsilon$ 15,600).

EXAMPLE 16

Chloromethyl 9α-fluoro-16β-methyl-3,11-dioxo-17α-propionyloxyandrosta-1,4-diene-17β-carboxylate

A solution of chloromethyl 9α-fluoro-11β-hydroxy-16β-methyl-3-oxo-17α-propionyloxyandrosta-1,4-diene-17β-carboxylate (966 mg.) in acetone (17.5 ml.) was stirred and treatd at room temperature with Jones reagent [a solution of chromium trioxide (267 g) in a mixture of conc. sulphuric acid (230 ml) and water (400 ml) made up to 1 litre with water (8N w.r.t. oxygen)] (0.87 ml.); the reaction mixture was stirred for 30 minutes. The reaction mixture was diluted with ether and washed successively with water, sodium bicarbonate solution and water, then dried (Mg $SO_4$) and was evaporated under reduced pressure to a colourless foam (937 mg) Preparative layer chromatography in chloroform on silica gave the major product (879 mg), a portion (400 mg.) of which crystallized from acetone to give the colourless title 11-ketone (224 mg), m.p. 162–166° (Kofler), $[\alpha]_D$475° (c 0.97, dioxan), $\lambda_{max}$ 234.5 nm ($\epsilon$ 15,300).

PREPARATION 3

9α-Fluoro-11β-hydroxy-17α-isobutyryloxy-16-methylene-3-oxoandrosta-1,4-diene-17β-carboxylic acid

A suspension of 9β-fluoro-11β, 17α-dihydroxy-16-methylene-3-oxoandrosta-1,4- diene-17β-carboxylic acid (1.68 g) and potassium carbonate (0.714 g) in acetone (9 ml) was treated with isobutyric anhydride (0.846 ml) and the mixture was refluxed on a steam bath for 2¾ hours; more isobutyric anhydride (0.1 ml) was added and after being refluxed for a further ¾ hour the product was isolated. The mixture was cooled and treated with water (25 ml) and acidified with concentrated hydrochloric acid (1 ml). The product was extracted with ethyl acetate, the combined extracts were then washed with water and the steroid was extracted with 5sodium bicarbonate. The combined alkaline extracts were washed with ethyl acetate then acidified with 2N-hydrochloric acid and the steroid re-extracted with ethyl acetate. The organic extracts were washed with water then dried (MgSo$_4$) and evaporated under reduced pressure to a colourless crystalline solid (1.70 g). A portion (51 mg) was recrystallized from acetone to give colourless crystals (35mg) of the title compound, m.p. 184–191° decomp. $[\alpha]_D$ − 89.6° (c 0.44, dioxan), $\lambda_{max}$ 237 nm ($\epsilon$15,400).

PREPARATION 4

Sodium 9α-fluoro-11β-hydroxy-17α-isobutyryloxy-16-methylene-3-oxoandrosta-1,4-diene-17β-carboxylate

A solution of 9α-fluoro-11β-hydroxy-17α-isobutyryloxy-16-methylene-3-oxoandrosta-1,4-diene-17β-carboxylic acid (1.7 g) in methanol (8ml) was stirred and treated with 2M methanolic sodium hydroxide (1.9 ml) to give a solution pHca11. The solution was diluted with ether (200 ) and refrigerated for 1½ hours. Solid was collected by filtration and washed with ether to give the title sodium salt (1.62 g), $\lambda_{max}$ 1600 cm[116 1], in nujol.

EXAMPLE 17

Chloromethyl 9α-fluoro-11β-hydroxy-17α-isobutyryloxy-16-methylene-3-oxoandrosta-1,4-diene-17β-carboxylate A suspension of sodium 9α-fluoro-11β-hydroxy-17α-isobutyryloxy-16-methylene-3-oxoandrosta-1,4-diene-17β- carboxylate (1.6 g) in hexamethylphosphoramide (4.1 ml) was stirred with chloromethyl iodide (1.28 ml.) for approx. 4 hours. The reaction mixture was diluted with ethyl acetate and ether, and washed successively with water, 5% sodium bicarbonate solution, sodium thiosulphate solution and water then dried (MgSO$_4$) and evaporated under reduced pressure to a white crystalline solid (1.51 g). Recrystallization from ether containing a little acetone gave colourless crystals (977 mg), a portion (400 mg) of which was recrystallized further to give the title chloromethyl ester as an ether solvate (264 mg), m.p. 142–147° (softening > 100°), $[\alpha]_D$ −60.3° (c 0.97, dioxan) $\lambda_{max}$ 237 nm ($\epsilon$15,600).

Example 18

Fluoromethyl 9α-fluoro-11β-hydroxy-16β-methyl-3-oxo-17α-propionyloxy-androsta-1,4-diene-17β-carboxylate A solution of chloromethyl 9α-fluoro-11β-hydroxy-16β-methyl-3-oxo-17α-propionyloxyandrosta-1,4-diene-17β-carboxylate [containing a little [< 5%] of the corresponding bis-(androstane-17β-carbonyloxy methane] (121 mg) in dry acetonitrile (1.4 ml) was stirred and treated with silver difluoride (182 mg). Stirring was continued for 2 days and the mixture was then diluted with ethyl acetate, filtered through kieselguhr, and the filtrate was washed with water. The organic phase was dried (MgSO$_4$) and evaporated to a white foam (122 mg) which was subjectd to preparative layer chromatography on silica in chloroform-acetone (10:1) to give a colourless crystalline solid, the title fluoromethyl ester (100 mg), m.p. 192–195°, softening at 183°, $[\alpha]_D$ + 35.5° (c 1.02 dioxan).

Example 19

Dichloromethyl 9α-fluoro-11β-hydroxy-16β-methyl-3-oxo-17α-propionyloxyandrosta-1,4-diene-17β-carboxylate A mixture of 9α-fluoro-11β-hydroxy-16β-methyl-3-oxo-17α-propionyloxyandrosta-1,4-diene-17β-carboxylic acid (500mg, solvated with 0.75 mole ethyl acetate) and phenyl(bromodichloromethyl)mercury (440 mg) in the benzene (20 ml) was stirred under oxygen-free nitrogen and heated under reflux for 5 hours. The mixture was allowed to cool and ethyl acetate (50 ml) was added; some crystalline solid (246 mg) was removed by filtration and washed with a little ethyl acetate. The filtrate and washings were washed with saturated sodium bicarbonate solution, then with water, then with water, dried (MgSo$_4$) and concentrated to a small volume. A further quantity, (49 mg) of crystalline solid was removed and the mother liquors were evaporated in vacuo to a semi-crystalline gum (503 mg). Preparative layer chromatography on silica developing with chloroform twice, then with chloroform-acetone (10:1) gave the major product as a very pale yellow foam (216 mg). Crystallization from ether containing traces of acetone gave colourless crystals (76 mg), of the title compound, m.p. 156–160° decomp, $[\alpha]_D$ × 33.8° (c 0.36,dioxan), $\lambda_{max}$ 237 nm ($\epsilon$ 15,210).

Preparation 5

17α-Benzoyloxy-9α-fluoro-11β-hydroxy-16β-methyl-3-oxoandrosta-1,4-diene-17β-carboxylic acid A solution of 11β,17α-dihydroxy-9α-fluoro-16β-methyl-3-oxoandrosta-1,4-diene-17β-carboxylic acid (5.027g) and triethylamine (4.65 ml. 3.38 g., 2.5 equiv.) in dry methylene chloride (60 ml.) at below 5° was treated with a cooled solution of benzoychloride (3.9 ml., 4.67g, 2.5 equiv.) in methylene chloride (60 ml) during 45 minutes. The solution was stirred for a further 45 minutes at below 5°, diluted with methylene chloride (100 ml.), then washed with 3.5% sodium bicarbonate solution, water, 2N-hydrochloric acid, and water, dried (MgSO$_4$), filtered and evaporated to give a white foam (9.04 g).

The foam was dissolved in acetone (120 ml) and stirred with diethylamine (4.8 ml., 3.4 g., 3.5 equiv.) at 22° [a solid crystallised after 2 minutes, and the reactin was substantially complete after 4 hours] for 18 hours. The mixture was concentrated and filtered and the solid was washed with acetone and dried at 23°/0.5 mm, for 1 hour to give the diethylamine salt of the title compound (7.4 g., 100% but possibly solvated).

The salt was dissolved in water (120 ml.) and the pH was adjusted to 2.0 to give a solid which was washed with water and dried over phosphorus pentoxide at 22°/0.5 mm. to give the 17α-benzoyloxy acid (5.666 g.,) which was used in Preparation 17 without purification. A sample (845 mg.) was crystallised from ethylacetate, and dried at 50°/0.5mm for 18 hours to give the 17α- benzoyloxy acid solvated with ethyl acetate (0.25 mole) as white prisms (720 mg.), m.p. 187 – 190°, $[\alpha]_D^{22}$ + 0.2° (c 1.01, dioxan), $[\alpha]_D^{23}$ +3.3° (c 1.202, Me$_2$SO), $\lambda_{max}$. 230.5 nm. ($\epsilon$25,800).

PREPARATION 6

Sodium 17α-Benzoyloxy-9α-fluoro-11β-hydroxy-16β-methyl-3-oxoandrosta-1,4-diene-17β-carboxylate A suspension of 17α-benzoyloxy-9α-fluoro-11β-hydroxy-16β-methyl-3-oxoandrosta-1,4-diene-17β-carboxylic acid (from example 21, 4.406 g) was reacted with sodium hydroxide as described in Preparation 16 to give the title sodium salt (4.284 g.,).

EXAMPLE 20

Chloromethyl 17α-benzoyloxy-9α-fluoro-11β-hydroxy 16β-methyl-3-oxoandrosta-1,4-diene-17β-carboxylate The sodium salt (from preparation 17. 4.223 g.) was added during 20 minutes to a solution of chloroiodomethane (3.05 ml., 7.38 g., 5 equiv.) in hexamethylphosphoramide (11 ml.) at 22°. The orange mixture was stirred at 22° for approx. 4 hours. (when almost all the salt had dissolved), diluted with ethyl acetate, washed with water, 3.5% sodium bicarbonate solution, dilute sodium thiosulphate solution, water, dried (MgSO$_4$) and evaporated to give a pale yellow foam (4.288g.,). The foam (1.895g) was crystallised from methanol, chromatographed on a column of silica and recrystallized from methanol:acetone to give the title chloromethyl ester (1.045 g.,) as colourless prisms,m.p. 209–216°, $[\alpha]_D^{22}$ + 18.5° (c 1.019, dioxan), $\lambda_{max}$ 233nm. (68 27.000).

EXAMPLE 21

Fluoromethyl 17α-benzoyloxy-9α-fluor-11β-hydroxy-16β-methyl-3-oxoandrosta-1,4-diene-17β-carboxylate A mixture of chloromethyl 17α-benzoyloxy-9α-fluoro-11β-hydroxy-16β-methyl-3-oxoandrosta-1,4-diene-17β-carboxylate (1.26g,) and finely ground silver fluoride (2.125 g., 7 equiv.) was stirred in dry acetonitrile (20 ml.) at 22° in the dark for 5 days. The mixture was filtered through Kieselguhr and diluted with ethyl acetate, washed with water, dried, and evaporated to give a colourless foam (1.272 g.). Preparative layer chromatography on silica gave a foam (1.044 g) which was crystallised from acetone:petrol (b.p 60 to 80°) to give title fluoromethyl ester (0.69g.,) as colourless prisms, m.p. 233–245°, $[\alpha]_D^{22}$ + 12.2° (c 1.021, dioxan), $\lambda_{max}$ 232 nm ($\epsilon$26,750).

EXAMPLE 22

Fluoromethyl 11β-hydroxy-16β-methyl-3-oxo-17α-propionyloxyandrosta-1,4-diene-17β-carboxylate A mixture of chloromethyl 11β-hydroxy-16β-methyl-3-oxo-17β-propionyloxyandrosta-1,4-diene-17β-carboxylate (196 mg) and silver monofluoride (373 mg) in dry acetonitrile (4 ml) was stirred at room temperature for 5¾ days. The mixture was then diluted with ethyl acetate and filtered thrugh kieselguhr; the filtrate was washed with water then dried (MgSO₄) and evaporated under reduced presure. The residue (185 mg) was recrystallised from acetone-petrol (bp. 60–80°) to give the title fluoromethyl 17β-carboxylate, mp. 209–212° (Kofler), $[\alpha]_D$ + 38° (c 0.665,dioxan), (EtOH) 242 nm ($\epsilon$15,100).

Example 23

Fluoromethyl 11β-hydroxy-16α-methyl-3-oxo-17α-propionyloxy androsta-1,4-diene-17β-carboxylate A mixture of chloromethyl 11β-hydroxy-16α-methyl-3-oxo-17α-propionyloxyandrosta-1,4-diene-17β-carboxylate (223 mg) and silver monofluoride (397 mg) in dry acetonitrile (4 ml) was stirred at room temperature for 5 days. More silver fluoride (297 mg) was added and stirring was continued for 7 days. The mixture was diluted with ethyl acetate, filtered through kieselguhr and the filtrate was washed with water and dried (Mg SO₄) removal of solvent gave the product which was shown by t.l.c. to contain a considerable amount of starting material. The mixture was retracted with silver monofluoride (500 mg) and acetonitrile (4 ml) at room temperature for 12 days, the product was reisolated as above and recrystallised five times from methanol to give the title fluoromethyl ester (103 mg), mp.223–225°, $[\alpha]_D$ + 15° (c 1.0,dioxan). $\lambda_{max}$ (EtOH) 242 non ($\epsilon$14,800).

EXAMPLE 24

Fluoromethyl 11β-hydroxy-3-oxo-17α-propionyloxyandrost-4-ene-17β-carboxylate A mixture of chloromethyl 11β-hydroxy-3-oxo-17α-propionyloxyandrost-4-ene-17β-carboxylate (500 mg) and silver monofluoride (980 mg) in dry acetonitrile (8.3 ml) was stirred at room temperature for 7 days and the product (487 mg) was isolated as described in Example 22. Two crystallisations from acetone gave the title fluoromethyl ester as colourless crystals (243 mg), mp 188–191° (Kofler)$[\alpha]_D$ + 58° (c 0.94 dioxan), $\lambda_{max}$ (EtOH) 240 nm ($\epsilon$15,770).

EXAMPLE 25

2',2',2',-Frifluoromethyl 9α-fluoro-11β-hydroxy-16β-methyl-3-oxo-17α-propionyloxyandrosta-1,4-diene-17β-carboxlate A stirred mixture of sodium 9α-fluoro-11β-hydroxy-16β-methyl-3-oxo-17α-propionyloxyandrosta-1,4-diene-17β-carboxylate (457 mg) and hexamethylphosphoramide (1.2 ml) was treated with 2,2,2-trifluoroethyl iodide (0.53 ml); stirring was continued at room temperature for 4 days. More trifluoroethyl iodide (0.53 ml) was added and reaction was continued for a further 13 days at room temperature then for 8½ hours at 50°. A further quantity of trifluorethyl iodide (0.53 ml) was added and heated and stirring was continued at 50° for 45 hours. The mixture was diluted with ethyl acetate, washed with 5% aqeuous sodium bicarbonate solution, and then with water, dried (Mg SO₄) and evaporated under reduced pressure to a semicrystalline foam (238 mg). The title trifluoroethyl 17β-carboxylate crystallised from acetone to give colourless crystals, mp.224–228° with softening at 213°, $[\alpha]_D$ + 36° (c 0.19, dioxan) $\lambda_{max}$ (EtOH) 237 nm ($\epsilon$15,550).

EXAMPLE 26

2',2',3',3'-Tetrafluoropropyl 9α-fluoro-11β-hydroxy-16β-methyl-3-oxo 17α-propionyloxyandrosta-1,4-diene-17β-carboxylate A mixture of sodium 9α-fluoro-11β-hydroxy-16β-methyl-3-oxo-17α-propionyloxyandrosta-1,4-diene-17β-carboxylate (457 mg) and 1-iodo-2,2,3,3,-tetrafluoropropane (940 mg) in hexamethylphosphoramide (1.2 ml) was stirred at room temperature for 3 days. A further addition of the iodide (327 mg) was made, stirring was continued for 3 more days and the product was isolated; the mixture was diluted with ethyl acetate and ether and washed with 5% aqueous sodium bicarbonate (twice) then with water, dried (MgSO₄) and evaporated under reduced pressure to a foam (349 mg). The product was subjected to preparative layer chromatography on silica in chloroformacetone (10:1) and eluted with ethyl acetate to give the major component (226 mg) which was recrystallised twice from acetone-petrol (bp 60–80°) to give colourless crystals of the title tetrafluoropropyl 17β-carboxylate, (130 mg), mp.210–212°(Kofler), $\lambda_{max}$ (ethanol) 238.5 nm ($\epsilon$15,500). (Found: C,59.3; H,6.1, $C_{27}H_{33}F_5O_6$ requires C,59.1, H,6.1%).

EXAMPLE 27

Fluoromethyl 9α-fluoro-11β-hydroxy-17αisobutyryloxy-16-methylene-3-oxoandrosta-1,4-diene-17β-carboxylate A mixture of chloromethyl 9α-fluoro-11β-hydroxy-17α-isobutyryloxy-16-methylene-3-oxoandrosta-1,4-diene-17β-carboxylate (545 mg) and silver difluoride (802 mg) in acetonitrile (6.2 ml) was stirred at room temperature for 6 days. The mixture was diluted with ethyl acetate and solid material was removed by filtration through kieselguhr; the filtrate was washed with water, dried (MgSO₄) and evaporated to a foam (516 mg). Preparative layer chromatography on silica in chloroform-acetone (20:1) followed by elution with ethyl acetate gave the major component as colourless crystals (400 mg) which were recrystallised twice from acetone to give the title fluoromethyl 17β-carboxylate (272 mg) mp. 177–185° (Kofler), $\lambda_{max}$ (ethanol) 237 nm ($\epsilon$16,130).

EXAMPLE 28

Fluoromethyl 9α-fluoro-16β-methyl-3,11-dioxo-17α-propionyloxy-androsta-1,4-diene-17β-carboxylate A mixture of chloromethyl 9α-fluoro-16β-methyl-3,11-dioxo-17α-propionyloxyandrosta-1,4-diene-17β-carboxylate (481 mg) and dry silver monofluoride (888 mg) in acetonitrile (7.5 ml) was stirred at room temperature for 25 days. Silver difluoride (282 mg) was added and stirring was continued for a further 8 days. TLC (chloroform-acetone-cyclohexane 4:1:7 multidevelopment) then showed complete reaction and the product was isolated by the method described in Example 27. The product (444 mg) was recrystallised from acetone to give the title 11-keto fluoromethyl ester as colourless crystals (353 mg), $R_F$ 0.71 (on silica in chloroform-acetone [4:1]).

Example 29

Bromomethyl 9α-fluoro-11β-hydroxy-16β-methyl-3-oxo-17α-propionyloxyandrosta-1,4-diene-17β-carboxylate A solution of iodomethyl 9α-fluoro-11β-hydroxy-16β-methyl -3-oxo-17α-propionyloxyandrosta-1,4-diene-17β-carboxylate 156 mg in acetone (5 ml) was treated with lithium bromide (236 mg) and the mixture was stirred at room temperature for 12 days. The solution was concentrated in vacuo and diluted with water (50 ml); the resulting precipitate was collected, after being stirred for 2 hours then washed with water and dried in vacuo at room temperature to give the crude product as an off white solid (122 mg). NM.R (DMSOd$^6$ and CDCl$_3$) showed that the material was different from the starting iodomethyl ester; AB quartets were observed centred at 4.08 and 4.17 ($J_{AB}$ 5Hz) in DMSOd$^6$) and at 4.06 and 4.46 τ ($J_{AB}$ 4.5 Hz) (CDCl$_3$). Preparative layer chromotography on silica in chloroform-acetone (10:1) followed by elution with ethyl acetate gave the major product as colourless crystals (91 mg) which were recrystallised from acetone-petrol (bp.60–80°) affording the title bromomethyl 17β-carboxylate (86 mg), mp. 160–171° decomp.Kofler), $R_F$ 0.65 (on silica, chloroform-acetone [4:1]).

PREPARATION 7

Chloromethyl 9α-fluoro-11β,17α-dihydroxy-16β-methyl-3-oxo-androsta-1,4-diene-17β-carboxylate Sodium 9α-fluoro-11β,17α-dihydroxy-16β-methyl-3-oxo-androsta-1,4-diene-17β-carboxylate (400 mg. prepared from the free acid and 2M methanolic sodium hydroxide by precipitation with ether) in hexamethylphosphoramide (1.3 ml) was stirred and treated with chloromethyl iodide (0.36 ml). Stirring was continued at room temperature for 3 hours 20 minutes and the mixture was diluted with ethyl acetate, washed with water, 5%sodium bicarbonate solution, again water, dried (MgSO$_4$) and evaporated in vacuo to a crystalline solid (443 mg). Trituration with ether and ethyl acetate gave a soluble material (230 mg) which was subjected to preparative layer chromatography in silica in chloroform-acetone (40:1). Recrystallisation from acetone-ether then from aqueous methanol gave the title 17α-hydroxy chloromethyl 17β-carboxylate as colourless crystals, mp.174–178° decomp,$\lambda_{max}$ (ethanol) 237.5 nm ($\epsilon$15.400).

EXAMPLE 30

Chloromethyl 9α- fluoro -11β- hydroxy -16β- methyl -3-oxo-17α-propionyloxyandrosta- 1, 4- diene- 17β-carboxylate A stirred suspension of chloromethyl 9α-fluoro-11β,17α-dihydroxy-16β-methyl-3- oxoandrosta-1,4-diene- 17β-carboxylate (100 mg) in propionic acid (1.0 ml) was treated at room temperature with trifluoroacetic anhydride (0.2 ml) and a solution of dry toluene P-sulphonic acid in chloroform (0.02 ml, concentration 0.12 g/ml). The resulting solution was heated at 75° for 24 minutes then poured into 3% aqueous sodium bicarbonate (6.4 ml) and the product was extracted with ethyl acetate. The extracts were washed with 5% sodium bicarbonate, water, dried (MgSO$_4$) and evaporated under reduced pressure to a colourless white semi-crystalline foam (118 mg). The major product in the mixture was shown by TLC on silica in chloroform-acetone (4:1) to have identical mobility ($R_F$ 0.58) with an authentic sample of the title 17α-propionate.

The following examples (a) to (g) illustrate topical formulations prepared in accordance with the invention. In those Examples the active ingredient may by any of the active steroids hereinbefore disclosed.

EXAMPLE (a)

Ointment

| | |
|---|---|
| Active ingredient | 0.1% w/w |
| Liquid paraffin B.P. | 10.0% w/w |
| White soft paraffin to produce | 100 parts by weight |

Ball-mill the steroid with a little of the liquid paraffin until the particle size is reduced to 95% by number below 5μ. dilute the paste and rinse out the mill with the remaining liquid paraffin, mix and add the suspension to the melted white soft paraffin at 50°C. Stir until cold to give a homogeneous ointment.

EXAMPLE (b)

Water-miscible cream

| | |
|---|---|
| Active ingredient | 0.1% w/w |
| Beeswax (White) | 15.0% w/w |
| Cetostearyl alcohol B.P.C. | 7.0% w/w |
| Cetomacrogel 1000 B.P.C. | 3.0% w/w |
| Liquid paraffin B.P. | 5.0% w/w |
| Chlorocresol | 0.1% w/w |
| Distilled water    to produce | 100 parts by weight |

Ball-mill the steroid with a little liquid paraffin as described in Example (a). Heat the available water to 100°C, add the chlorocresol, stir to dissolve and cool to 65°C. Melt together the beeswax, cetostearyl alcohol and cetomacrogel and maintain at 65°C. Add the steroid suspension using the remaining liquid paraffin for rinsing. Add the steroid oil phase at 60°C to the chlorocresol aqueous phase at 65°C and stir rapidly while the emulsion cools over the gelling point (40–45°C). Continue to stir at slow speed until the cream sets.

EXAMPLE (c)

Lotion

| | |
|---|---|
| Active ingredient | 0.25% w/v |
| Lanbritol wax* | 0.93% w/v |
| Diethylene glycol monostearate | 0.65% w/v |
| Cetostearyl alcohol B.P.C. | 0.65% w/v |
| Liquid paraffin B.P. | 1.95% w/v |
| Glycerin | 5.0% w/v |
| Isopropyl alcohol | 6.5% w/v |
| Methyl p-hydroxy benzoate | 0.15% w/v |
| Distilled water to produce | 100 volumes |

*Lanbritol wax is a non-ionic wax for stabilising emulsions consisting of a mixture of fatty alcohols with polyethylene glycol ethers of fatty alcohols sold by Ronsheim Moore of London W.C.1 England.

Ball-mill the steroid with half the glycerin, as in Example (a), and use the isopropyl alcohol for dilution and rinsing purposes.

Melt together the lanbritol wax, diethylene glycol monostearate, cetostearyl alcohol and liquid paraffin and maintain at 60°C. Heat the available water and remaining glycerin to 95°C. Add the methyl parahydroxy benzoate and stir until dissolved. Cool to 65°C. Add the oily mix at 60°C to the aqueous phase at 65°C and allow to cool while stirring rapidly until the emulsion gels at 40 – 45°C, thereafter stir slowly. Add the well mixed steroid suspension slowly to the lotion base and stir to obtain a homogeneous mix.

EXAMPLE (d)

Aphthous Ulcer Pellets

| | |
|---|---|
| Active ingredient (microfine) | 0.25 mg. |
| Lactose | 69.90 mg. |
| Acacia | 3.00 mg. |
| Magnesium stearate | 0.75 mg. |

Pass the steroid, lactose and acacia, separately through a No. 60 B.S. mesh sieve. Blend the powders and granulate with 50% ethanol in water. Pass the mass through a No. 12 mesh sieve and dry the granules at 50°C. Pass the dried granules through a No. 20 mesh B.S. sieve and blend in the magnesium stearate, previously passed through a No. 100 mesh B.S. sieve. Compress in a conventional manner on 7/32 inch diameter punches, to give a pellet that will dissolve slowly in the mouth.

EXAMPLE (e)

Retention Enema

| | |
|---|---|
| Active ingredient (microfine) | 0.0005% w/v |
| Tween 80 | 0.05% w/v |
| Ethanol | 0.015% v/v |
| Methyl p-hydroxy benzoate | 0.08% w/v |
| Propyl p-hydroxy benzoate | 0.02% w/v |
| Distilled water to | 100 vols. |

Heat the available water to 95°C, and the methyl and propyl p-hydroxy benzoates and stir to dissolve. Cool the vehicle to room temperature. Disperse the steroid in the ethanol and add to the Tween 80; warm the mixture to 50°C and stir until the steroid is in solution. Add the steroid solution to the vehicle, stirring vigorously to avoid precipitation, and make up to volume with water it required. Distribute the enema into plastic bags e.g. P.V.C. bags for self-administration or into other contaners suitable for use.

EXAMPLE (f)

Eye Drops

| | | |
|---|---|---|
| Active ingredient | 0.025% | w/v |
| Tween 80 | 2.5% | w/v |
| Ethanol | 0.75% | w/v |
| Benzalkonium chloride | 0.02% | w/v |
| Phenyl ethanol | 0.25% | v/v |
| Sodium chloride | 0.60% | w/v |
| Water for injection to | 100 volumes. | |

Dissolve the sodium chloride, benzalkonium chloride and phenyl ethanol in the water for injection, Suspend the steroid in the alcohol and add to the Tween 80. Warm the mixture to 50°C and stir until dissolved. Add the steroid solution to the eye-drop vehicle with rapid stirring to obtain a clear solution. Sterilise the bulk by filtration through a sintered glass filter and distribute into sterile small well filled, neutral glass eye-drop containers.

EXAMPLE (g)

Nasal Drops

| | |
|---|---|
| Active ingredient | 0.005% w/v |
| Tween 80 | 0.05% w/v |
| Alcohol 95% | 0.15% v/v |
| Methyl paraben (p-hydroxy benzoate) | 0.04% w/v |
| Propyl paraben (p-hydroxy benzoate) | 0.02% w/v |
| Sodium chloride | 0.70% w/v |
| Distilled water to | 100 volumes |

Dissolve the sodium chloride and the parabens in the distilled water heated to 95°C, and allow the solution to cool. Disperse the steroid in the alcohol and add to the Tween 80. Warm the mixture to 50°C and stir until solution of thesteroid is effected. Add the steroid solution to the vehicle with rapid stirring to obtain a clear solution. Filter the solution free from particulate matter through a sintered glass filter and distribute into small, well filled containers.

The following Example (h) illustrates a formulation for internal administration according to the invention; the active ingredient used may be any of the active steroid hereinbefore disclosed.

EXAMPLE (h)

Oral Tablet

| | |
|---|---|
| Active ingredient | 0.5 mg. |
| Lactose | 175.5 mg. |
| Maize starch (dried) | 20.0 mg. |
| Gelatin | 2.0 mg. |
| Magnesium stearate | 2.0 mg. |
| Total weight | 200.0 mg. |

A suspension of 300 mg. of the active ingredient in 2 ml. of water containing 0.1% of Tween 80 is milled for 16 hours in a 10 ml. nylon pot about three quarters filled with steatite balls, until 90% by number of the particles have a diameter of less than 10 microns. The maize starch and lactose are blended and passed through a 60 mesh B.S. sieve and granulated with a 10% solution of gelatin, containing the suspension of the active ingredient and washings from the nylon pot, by passing through a 16 mesh B.S. sieve. The granules are dried at 40°C overnight passed through a 20 mesh B.S. sieve and blended with magnesium stearate and tabletted using a tabletting machine having a 5/32 inch flat-bevelled punch.

EXAMPLE (i)

Ointment

| | |
|---|---|
| 2'-Fluoroethyl-9α-fluoro-11β-hydroxy-16β-methyl-3-oxo-17α-propionyloxyandrosta-1,4-diene-17β-carboxylate | 0.25% w/w |
| Benzyl Alcohol | 1.0% w/w |
| White soft paraffin to produce | 100 parts by weights |

Dissolve the steroid in the benzyl alcohol. Add this solution to the melted white soft paraffin at 50°C. Stir until cold to give a homogenous ointment.

We claim:

1. A compound of the formula

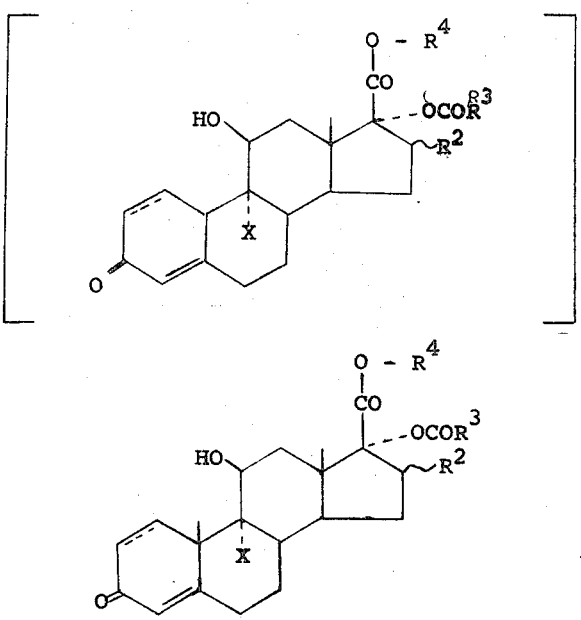

wherein
X represents a hydrogen, chlorine or fluorine atom;
$R^2$ represents a hydrogen atom, a methylene group or an α- or β-methyl group;
$R^3$ represents a hydrogen atom or $C_{1-4}$ alkyl group;
$R^4$ represents a fluoro-, chloro- or bromomethyl group or a fluoroethyl group and ==== represents a single or double bond.

2. A compound according to claim 1 wherein $R^4$ represents a methyl group substituted by a fluorine or chlorine atom; or a fluoroethyl group.

3. A compound according to claim 1 wherein $R^3$ represents an alkyl group containing 1 to 3 carbon atoms.

4. A compound according to claim 1 wherein $R^3$ represents an ethyl group.

5. A compound according to claim 1 wherein $R^2$ represents a methyl group or a methylene group.

6. A compound according to claim 1 wherein ==== represents a double bond.

7. A compound according to claim 1 wherein X represents a fluorine or hydrogen atom.

8. A compound according to claim 1 wherein $R^2$ represents a hydrogen atom, X represents a hydrogen atom and ==== represents a single bond.

9. A compound according to claim 1 wherein X represents a fluorine atom, $R^2$ represents a methylene group and ==== represents a double bond.

10. A compound according to claim 1, said compound being 2'-fluoroethyl 9α-fluoro-11β-hydroxy-16β-methyl-3-oxo-17α-propionyloxy-androsta-1,4-diene-17βcarboxylate.

11. A compound according to claim 1, said compound being chloromethyl 9α-fluoro-11β-hydroxy-16β-methyl-3-oxo-17α-propionyloxy-androsta-1,4-diene-17β-carboxylate.

12. A compound according to claim 1, said compound being chloromethyl 11β-hydroxy-16β-methyl-3-oxo-17α-propionyloxy-androsta-1,4-diene-17β-carboxylate.

13. A compound according to claim 1, said compound being fluoromethyl 9α-fluoro-11β-hydroxy-16β-methyl-3-oxo-17α-propionyloxy-androsta-1,4-diene-17β-carboxylate.

14. A compound according to claim 1, said compound being fluoromethyl 9α-chloro-11β-hydroxy-16β-methyl-3-oxo-17α-propionyloxy-androsta-1,4-diene-17β-carboxylate.

15. A compound according to claim 1, said compound being fluoromethyl 9α-fluoro-11β-hydroxy-16α-methyl-3-oxo-17α-propionyloxy-androsta-1,4-diene-17β-carboxylate.

16. A compound according to claim 1, said compound being chloromethyl 9α-fluoro-11β-hydroxy-16-methylene-3-oxo-17α-propionyloxy-androsta-1,4-diene-17β-carboxylate.

17. A compound according to claim 1, said compound being fluoromethyl 9α-fluoro-11β-hydroxy-16-methylene-3-oxo-17α-propionyloxy-androsta-1,4-diene-17β-carboxylate:

18. A compound according to claim 1, said compound being fluoromethyl 11β-hydroxy-16β-methyl-3-oxo-17α-propionyloxy-androsta-1,4-diene-17β-carboxylate.

19. Fluoromethyl 9α - fluoro - 16β methyl - 3,11 - dioxo - 17α -propionyloxyandrosta - 1,4 - diene - 17β - carboxylate.

* * * * *